US012371250B2

(12) United States Patent
Abegglen et al.

(10) Patent No.: US 12,371,250 B2
(45) Date of Patent: *Jul. 29, 2025

(54) KIT FOR THE PREPARATION OF A BEVERAGE IN A CENTRIFUGAL BREWING DEVICE

(71) Applicant: Société des Produits Nestlé S.A., Vevey (CH)

(72) Inventors: Daniel Abegglen, Rances (CH); Arnaud Gerbaulet, Oye et Pallet (FR); Jean-Francois Tinembart, Yverdon (CH); Alexandre Perentes, Lausanne (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

This patent is subject to a terminal disclaimer.

(21) Appl. No.: 17/678,163

(22) Filed: Feb. 23, 2022

(65) Prior Publication Data

US 2022/0177219 A1    Jun. 9, 2022

Related U.S. Application Data

(63) Continuation of application No. 16/662,852, filed on Oct. 24, 2019, now Pat. No. 11,401,105, which is a
(Continued)

(30) Foreign Application Priority Data

Apr. 1, 2011    (EP) ..................... 11160914

(51) Int. Cl.
*B65D 85/804*    (2006.01)
*A23F 5/26*    (2006.01)
(Continued)

(52) U.S. Cl.
CPC .......... *B65D 85/8055* (2020.05); *A23F 5/262* (2013.01); *A47J 31/22* (2013.01); *A47J 31/3676* (2013.01); *B65D 85/8052* (2020.05)

(58) Field of Classification Search
CPC ............ B65D 85/8043; B65D 85/8052; B65D 85/8055; B65D 85/8064; B65D 85/8046;
(Continued)

(56) References Cited

U.S. PATENT DOCUMENTS 7,798,055 B2 *  9/2010  Mandralis ............. A47J 31/002
                                                            99/295
8,220,382 B2    7/2012  Verbeek
(Continued)

FOREIGN PATENT DOCUMENTS

| EP | 2000062 | 12/2008 |
|----|---------|---------|
| WO | WO2010026053 | 3/2010 |
| WO | WO2010063644 | 6/2010 |

OTHER PUBLICATIONS

How Stuff Works NPL, published Apr. 4, 2003, https://web.archive.org/web/20030404175106/http://home.howstuffworks.com/question645.htm (Year: 2003).*

*Primary Examiner* — Erik Kashnikow
*Assistant Examiner* — Bryan Kim
(74) *Attorney, Agent, or Firm* — K&L Gates LLP

(57) ABSTRACT

Kit for the preparation of a beverage in a centrifugal brewing device comprising a capsule by feeding liquid in the capsule and rotating the capsule along a central axis to produce centrifugal forces on the liquid traversing the capsule thereby forcing the beverage out of the capsule by such centrifugal forces, wherein the capsule comprises containment walls forming a main cavity of central axis containing beverage ingredients; wherein said kit further comprising an insert which is separate from the capsule and comprising a
(Continued)

ring-shaped portion intended to form a valve engaging portion engaging against a valve means of the centrifugal brewing device.

16 Claims, 4 Drawing Sheets

Related U.S. Application Data continuation of application No. 14/009,263, filed as application No. PCT/EP2012/055607 on Mar. 29, 2012, now abandoned.

(51) Int. Cl.
    *A47J 31/22*     (2006.01)
    *A47J 31/36*     (2006.01)

(58) Field of Classification Search
    CPC ............ B65D 85/8061; B65D 85/8049; B65D 85/8067; A47J 31/22; A47J 31/24; A47J 31/34; A47J 31/4496
    See application file for complete search history.

(56) References Cited

U.S. PATENT DOCUMENTS

| | | | |
|---|---|---|---|
| 8,409,646 B2 | 4/2013 | Yoakim et al. | |
| 8,431,175 B2 | 4/2013 | Yoakim et al. | |
| 8,813,634 B2 * | 8/2014 | Yoakim | B65D 85/8052 99/302 C |
| 8,916,215 B2 * | 12/2014 | Yoakim | B65D 85/8055 426/77 |
| 9,271,598 B2 | 3/2016 | Yoakim et al. | |
| 9,277,837 B2 | 3/2016 | Yoakim et al. | |
| 9,545,121 B2 | 1/2017 | Perentes et al. | |
| 9,668,604 B2 | 6/2017 | Yoakim et al. | |
| 9,694,969 B2 | 7/2017 | Abegglen et al. | |
| 9,718,606 B2 | 8/2017 | Alvarez et al. | |
| 10,231,569 B2 * | 3/2019 | Perentes | B65D 85/8058 |
| 10,743,706 B2 | 8/2020 | Abegglen et al. | |
| 11,401,105 B2 * | 8/2022 | Abegglen | B65D 85/8055 |
| 2005/0266122 A1 | 12/2005 | Franceschi | |
| 2009/0101022 A1 | 4/2009 | Levin | |
| 2010/0173056 A1 * | 7/2010 | Yoakim | A47J 31/407 426/433 |
| 2010/0288131 A1 | 11/2010 | Kilber et al. | |
| 2011/0027426 A1 | 2/2011 | Belloli | |
| 2011/0052761 A1 | 3/2011 | Yoakim et al. | |
| 2011/0073607 A1 | 3/2011 | Fu et al. | |
| 2012/0058226 A1 | 3/2012 | Winkler et al. | |
| 2012/0276264 A1 | 11/2012 | Rivera | |
| 2012/0301581 A1 * | 11/2012 | Abegglen | A47J 31/3676 426/112 |

* cited by examiner

KIT FOR THE PREPARATION OF A BEVERAGE IN A CENTRIFUGAL BREWING DEVICE

PRIORITY CLAIMS

This application is a continuation of U.S. application Ser. No. 16/662,852 filed Oct. 24, 2019, which is a continuation of U.S. application Ser. No. 14/009,263 filed Oct. 1, 2013, which is a National Stage of International Application No. PCT/EP12/55607 filed Mar. 29, 2012, which claims priority to European Patent Application No. 11160914.5 filed Apr. 1, 2011, the entire contents of which are incorporated herein by reference.

FIELD OF THE INVENTION

The present invention relates to the field of portioned beverage using capsules for preparing a beverage in a beverage brewing device. The invention more particularly relates to a capsule kit for preparing a beverage in a centrifugal brewing unit.

BACKGROUND

The preparation of a beverage by a single-use capsule containing beverage ingredients is known. In general, the capsule is inserted in a beverage production device, such as a coffee machine, liquid is fed in the capsule, the liquid interacts with the beverage ingredients and a beverage is extracted from the capsule under pressure or by gravity.

The preparation of a beverage by using the centrifugation is known. The principle mainly consists in providing beverage ingredients in a container of the capsule, feeding liquid in the receptacle and rotating the receptacle at elevated speed to ensure interaction of liquid with the ingredients so as to create a gradient of pressure of liquid in the receptacle; such pressure increasing gradually from the centre towards the periphery of the receptacle. As liquid traverses the ingredients, e.g., a coffee bed, extraction of the beverage compounds takes place and a liquid extract is obtained that flows out at the periphery of the receptacle.

The term "capsule" refers to any flexible, rigid or semi-rigid container containing beverage ingredients. Other synonymous to a capsule are: "pod", "pad", "cartridge" or "sachet". The capsule can be single use. The container can also be filled with ingredients by the user to form the capsule just before use.

The term "ingredients" means any suitable beverage substance such as ground coffee, soluble coffee, leaf tea, soluble tea, herbal tea, dairy powder, culinary powder, baby food, other beverage nutritional ingredients and any combinations thereof.

A capsule system using centrifugation forces is described in the following documents: EP2210539, WO2008/148604, WO2008148650, WO2008/148646, WO2008/148656 and WO2010/026045.

In particular, in the international patent application WO2008/148646, a capsule intended for being used in a centrifugation device is described which has a body with a cavity, a lid closing the cavity and a flange; such flange being engaged by a valve means of the beverage production device. The lid has openings or pores at its periphery for enabling the flow of centrifuged beverage to leave the cavity. The flow then passes on the upper surface of the flange and between the valve means when a passage is created by a relative movement between the valve means and the flange of the capsule. In the international patent application WO2010/066705, a capsule is also intended for being used in a centrifugation device. The capsule comprises a flange with an annular raising portion forming a restriction for the centrifuged liquid flow path when said portion is engaged by a pressing surface of the beverage production device.

EP2000062 relates to a capsule for use in a centrifugation device wherein the capsule comprises a body and lid sealed together by sealing means acting as a valve.

The capsules of the prior art are relatively complex and costly. There would be a need to provide more flexibility for inserting simpler and lower cost capsules in the centrifugation device while maintaining the control of the extraction parameters, in particular, a sufficient gradient of pressure in the capsule. There would also be a need for providing an easy changeover of the extraction conditions, such as varying the pressure gradient or flow characteristics in the capsule.

SUMMARY

The invention provides a solution to such objectives as well as possible additional advantages.

The present invention relates to a capsule kit comprising a capsule and an insert for the preparation of a beverage in a centrifugal brewing device by feeding liquid in the capsule and rotating the capsule along a central axis to produce centrifugal forces on the liquid traversing the capsule thereby forcing the beverage out of the capsule by such centrifugal forces, wherein the capsule comprises containment walls forming a main cavity of central axis containing beverage ingredients and the insert being a part separate from the capsule and comprising a ring-shaped portion intended to form a valve engaging portion engaging against a valve means of the centrifugal brewing device. Preferably, the ring-shaped portion of the insert has a larger diameter than the largest diameter of the capsule.

The invention further relates to the use of a kit, as described in the present application, for preparing a beverage in a centrifugal brewing device; the insert forming a valve engaging portion engaging against a valve means of the device and the capsule being configured to fit into a capsule holder of the device.

The insert may be designed, e.g., of durable material (e.g., hard plastic or rubber), to be used several times in the device. The capsule is designed, e.g., of light and low cost material, to be used only one time in the device.

The invention is further defined by the appended claims.

DETAILED DESCRIPTION OF THE INVENTION

Figure 1:
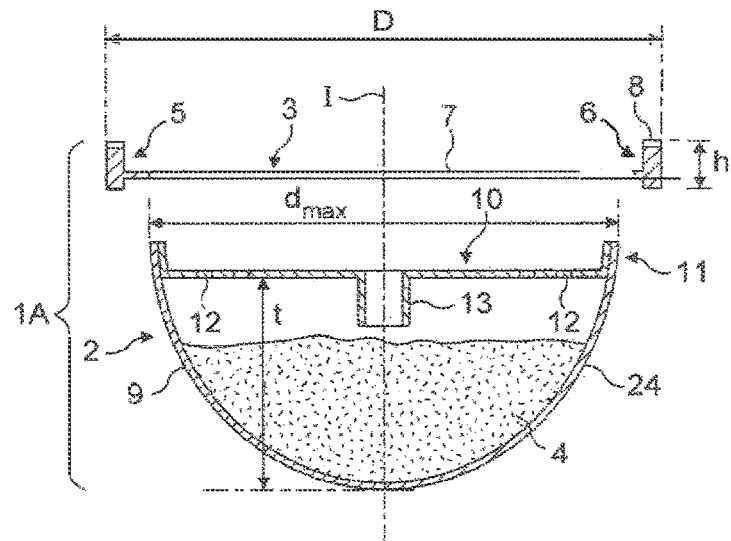
FIG. 1 shows a cross sectional view of a capsule kit including a capsule and an insert of the invention according to a first embodiment.

The invention relates to a capsule kit 1A for the preparation of a beverage in a centrifugal brewing device.

The kit 1A comprises a capsule 2 and an insert 3. The capsule comprises containment walls forming a main cavity 4 of central axis "I" containing beverage ingredients. The size of the capsule may vary depending on the amount of ingredients stored therein. In a preferred mode, the depth (t) of the cavity of the capsule may differ whereas the largest diameter ($d_{max}$) of the capsule remains constant.

The insert 3 and capsule 2 are two separate parts. The insert comprises a ring-shaped portion 5 intended to form a valve engaging portion for engaging against a valve means of the centrifugal brewing device as it will be later explained.

The ring-shaped portion 5 of the insert has preferably an outer diameter (D) larger than the largest diameter ($d_{max}$) of the capsule.

The insert has a transversal annular or circular portion 6 which is inwardly connected to the ring-shaped portion 5. The two portions 5, 6 are preferably integrally connected. For instance, the insert is formed of a single injected or thermoformed plastic or bio-polymer piece.

The ring-shaped portion 5 extends axially beyond above and/or below the annular portion 6. Therefore, the insert has generally the form of a "T" in transversal cross-section. Preferably, the portion extends at least above the annular portion of a certain distance. The axial direction is meant to be any direction parallel to axis "I". The longer axial dimension "h" of the ring-shaped portion 5 is preferably comprised between 1.5 and 4.0 mm, more preferably 1.8 and 3.0 mm.

It should be noted that the kit may include more than one insert 3 of different dimensions, for example, a series of inserts with different axial dimensions "h" of the portion 5. An insert may also be associated to different capsules, for example, capsules of different sizes, e.g., different depth (t) and/or capsule containing different beverage ingredients, e.g., different coffee blends and/or weight.

The insert 2 is preferably hollow in the centre at and around the axis "I". For instance, a large opening 7 is present. This opening allows the beverage to traverse the insert during the beverage extraction in the device. Reinforcement members may however occupy part of the opening such as radially oriented spokes or an equivalent structure.

In a variant (not represented) the annular or circular portion has several through-openings. Such openings may be provided for allowing gas and/or liquid flow outwardly or through the insert.

The ring-shaped portion 5 has preferably a structure in relief and/or recess on its upper surface and/or lower surface enabling to create beverage radial flow passages during centrifugation. Preferably, a series of radial grooves 8 are present on the upper surface of the portion. The grooves can be formed like knurls. The grooves are preferably rectilinear and radial. However, they may also take a curved shape, a "Z" shape or the shape of a labyrinth. The grooves can also be formed from a multitude of studs provided on the upper surface of the portion. The portion 5 may also end upwardly by a simple edge line with many radial cuts.

In a variant (not represented) the flow passage is obtained by radial openings provided through the ring-shaped portion 5. These through-openings thereby enable the beverage to traverse the portion 5 from its inner side to its outer side.

The containment walls may be formed by a cup-shaped body 9 and a lid 10 connected to the body. The cup-shaped body has preferably a circular opening or mouth delimiting the cavity for receiving the ingredients and a closed bottom. The bottom may be flat or concave (as illustrated) or may take more complex shapes such as be corrugated. The lid is preferably disc-shaped. It can be flexible, semi-rigid or rigid.

The connection between the body and lid may be formed by a flange 11. The capsule is preferably free of outwardly protruding flange. The flange may also be outwardly protruding and be flexible enough to be forced to take an upward position when the capsule is installed in a capsule holder and/or in the insert such.

The connection may be obtained by any means such as: ultrasonic sealing, heat sealing, crimping, press-fitting and combinations thereof.

The lid 10 of the capsule may comprise a series of beverage outlets 12 provided close to the periphery of the lid, e.g., close to the flange 11. Preferably, the outlets 12 are distant from the flange 11 a radial distance comprised between 1 and 12 mm, most preferably between 3 and 8 mm. These outlets may be have a circular cross-section or may be slits. They are preferably of smaller cross-section than the average particle cross-section of the beverage ingredients. However, larger openings may be provided in combination with a filter element placed upstream or downstream of the lid. Preferably, a filter layer is so placed between the lid and the ingredients or on top of the lid. The filter layer may be formed of paper, polymeric material or combinations thereof.

The centre of the lid may optionally be further provided with a tubular guiding portion 13. This portion 13 serves to guide a water injection member such as a needle of the beverage preparation device. The tubular guiding portion 13 may also be closed by a perforable or breakable part or may be open. In another possible mode, the lid may also be a flat perforable membrane without pre-opening. For instance, the membrane is made of aluminium or a laminate of PET and/or PP and aluminium or EVOH replacing aluminium.

Figure 2:
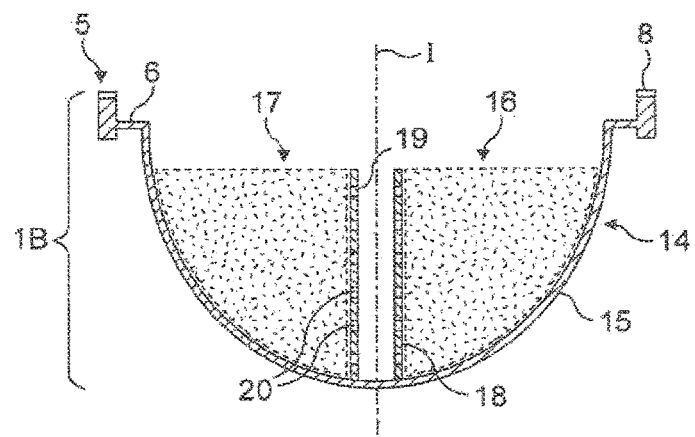
FIG. 2 shows a cross sectional view of a capsule kit according to a second embodiment.
Figure 3:
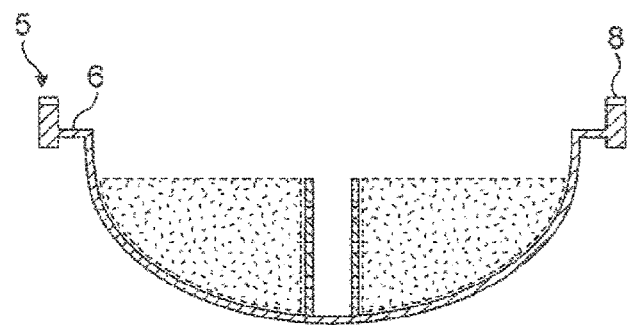
FIG. 3 shows a cross sectional view of a capsule kit according the second embodiment but of smaller size than the kit of FIG. 2.

In the second embodiment of FIG. 2 or 3, the kit 1B comprises an insert 14 which has a cup-shaped portion 15 comprising a cavity 16 for receiving a capsule 17 in a removable manner. The capsule may be a porous pod. The pod may take the form of a cup with a relatively flat lid or be a torus. It has containment walls forming a liquid-porous bag. For instance, all the walls are made of a liquid-porous material, e.g., a fabric. The material may be chosen amongst: woven or non-woven polymeric fibres or cellulose (e.g. filter paper). The containment wall may comprise an axially oriented central aperture 18 traversing from the top surface to the bottom surface of the capsule. The insert comprises a central tubular portion 19 fitting in the central aperture 18 of the capsule. The tubular portion 19 may further comprise liquid distribution openings 20. The distribution (e.g., density and/or size) of the openings may vary along its length for providing different inserts.

FIG. 2 shows a capsule kit of large size comprising a porous coffee pod containing a sufficient amount of ground coffee for preparation of a long coffee cup.

FIG. 3 shows a kit of smaller size comprising a porous coffee pod containing a sufficient amount of ground coffee for the preparation of a short coffee cup such as a ristretto or espresso. It should be noted that the capsule of FIG. 3 could also be associated with the larger insert 14 of FIG. 2 so by this, the need for too many different inserts is removed.

Preferably, the kit can be proposed in three progressively increasing sizes for respectively delivering a short cup (i.e., 25-50 ml of beverage), a medium cup (i.e., 100-120 ml of beverage) and a large cup (i.e., 200-400 ml of beverage).

Figure 4:
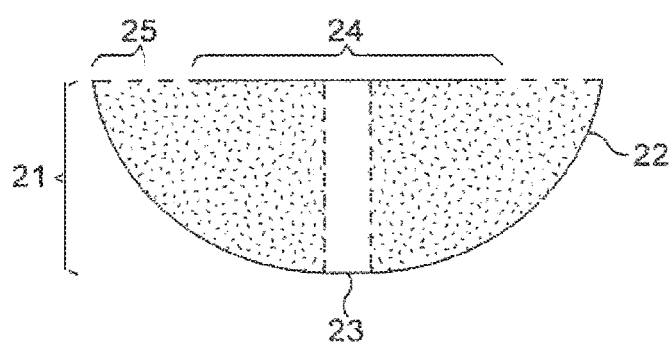
FIG. 4 is a cross-sectional view of a capsule forming one part of the kit according to a variant of FIG. 2.

As illustrated in FIG. 4, the capsule 21 (illustrated without the insert) can comprise strategically positioned liquid-tight areas to prevent liquid (water) bypass and to properly distribute evenly the liquid through the complete mass of ingredients. The capsule 21 differs from the capsule 16 in that its bottom wall 23 and sidewall 22 is covered or made of a liquid-tight material. The liquid-tight material can be flexible such as made of aluminium or aluminium-PP or PET-EVOH-PP foil. Furthermore, the central area 24 of the lid is also covered or made of liquid-tight material. As a result, only an annular portion 25 close to the periphery of the lid remains liquid porous. As a result, when the capsule is rotated and the centrifugal forces are applied in the capsule, liquid is forced to move outwards and upwards in direction of the porous portion 25 and leaves the capsule through the portion 25.

The capsule of FIG. 4 can be used to form a kit with an insert 3 as illustrated in FIG. 1 (without cup portion 15) or FIG. 2 (with a cup portion 15).

The capsule of the invention is preferably sealed into a gas-tight package. The capsule can be packed individually or in group in the package. The capsule can be packaged in the package under vacuum or with a protective gas such as nitrogen and/or carbon dioxide. The capsule may also be sealed by a perforable or peel-off sealing membrane. In this case, the cavity of the capsule is preferably flushed with a protective gas such as nitrogen and/or carbon dioxide.

Figure 5:
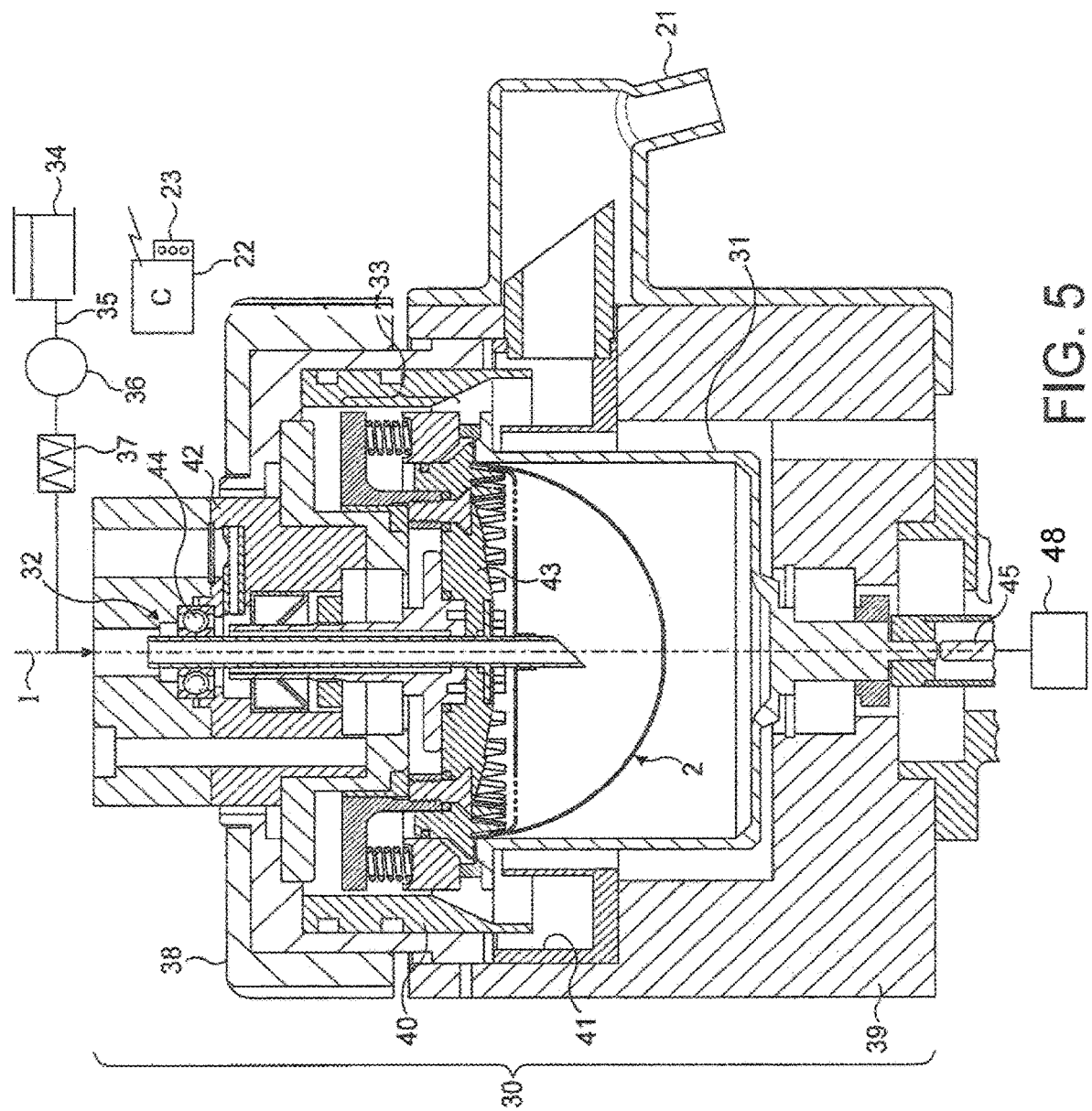
FIG. 5 is a cross-sectional partial view of the capsule kit in a centrifugation beverage brewing device according to a variant of FIG. 2.
Figure 6:
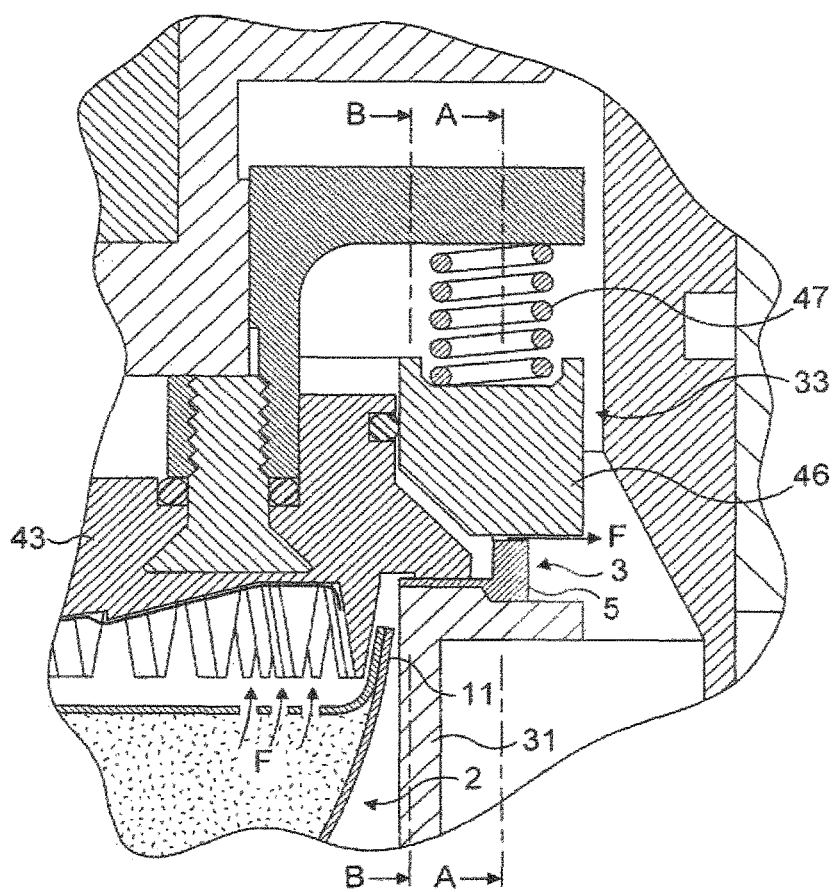
FIG. 6 shows a detail in cross-section of the device and kit of capsule according to the first embodiment.
Figure 7:
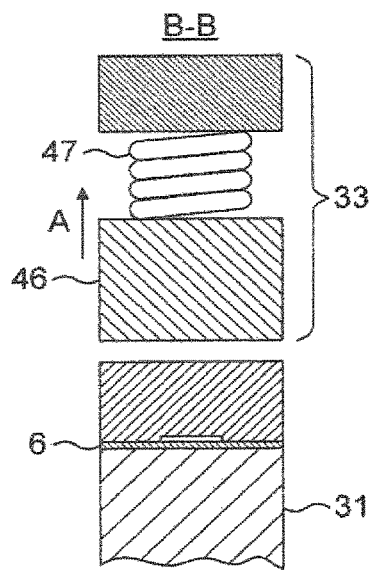
FIG. 7 is a cross-section along line B-B of FIG. 6.
Figure 8:
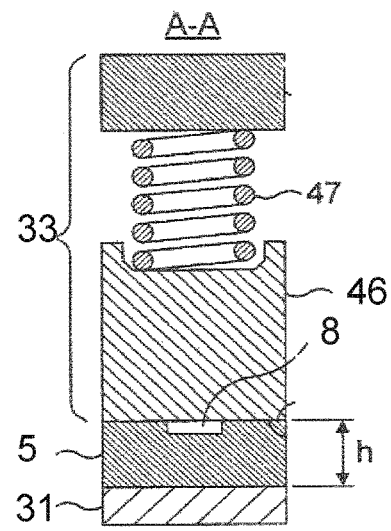
FIG. 8 is a cross-section along line A-A of FIG. 6.

A general representation of a capsule system of the invention is illustrated on FIGS. 5 and 6. The system comprises a capsule kit as described previously. The kit is inserted in a beverage preparation device 30 comprising a capsule holder 31, a water injection device 32 for supplying water in the capsule and a valve means 33. The device further comprises a water reservoir 34 for supplying water in a water circuit 35. Water is circulated in the water circuit by means of a pump 36 and can be heated by an in-line heater 37 to a controlled temperature before it enters into the capsule.

Concerning the device, it comprises more particularly an upper frame 38 and a lower frame 39 which are non rotatable in centrifugation. The upper and lower frames 38, 39 have collecting parts 40, 41 respectively surrounding the capsule onto which the centrifuged beverage is received when leaving the capsule. The collecting part 40 forms a tubular jacket surrounding the capsule and separated from it by a small gap (also called "flying distance"). The second collecting part 41 can be a U-shaped reservoir placed below the first collecting part 40. An upper rotatable part 42 of the device is mounted around the injection means 32 which are static relative to the upper frame. For example, a ball bearing 44 is inserted between the injection means and the part. This upper rotatable part 42 comprises a capsule engaging plate 43, e.g., with a convex engaging surface. The valve means 33 are mounted around said plate 43. The lower frame 39 also supports the capsule holder 31 which is rotatably mounted via the ball bearing. The capsule holder is connected via an axle 45 to a rotary motor 48. FIG. 6 shows the beverage flow "F" through the capsule and through the grooves of the ring-shaped portion of the insert.

The engagement of the valve means against the insert 3 creates a restriction to the beverage flow that can be varied such as by varying the rotational speed. As the rotational speed increases, the pressing part 46 is moved upwards against the action of a spring means 47 so as to leave a larger clearance for the flow of beverage. The dimension "h" of the ring-shaped portion 5 of the insert determines the counter-pressure exerted on the valve means so that when "h" increases, a larger pressure of liquid is required to open and keep the valve opened. The larger pressure of liquid induces a larger gradient of pressure in the capsule. Of course, it may also be possible to control the flow of beverage only through the grooves 8 on the insert or through openings in the insert without opening the valve. The opening of the valve means is indeed dependent on the flow passage surface area at the grooves and/or through-openings and the counter-force applied by the distance "h" of the insert.

Therefore, by replacing the insert 3 with another one having a different dimension "h", the counter-pressure of the valve means can be varied. Therefore, it is possible to adjust the counter-pressure on the valve means by selecting an insert of predefined dimension "h" while operating an identical or different capsule for brewing a beverage in the device. For example, the characteristics of the beverage, such as coffee, can be varied. By also selecting a capsule of different size, e.g., by increasing its depth "h" for storing a larger amount of coffee it is then possible to further vary the beverage characteristics. Therefore, an even larger number of choices for different beverages (e.g., coffees) is offered to the consumer by providing a selection of different inserts and/or capsules of different sizes.

The invention is claimed as follows:

1. A kit to be inserted in a centrifugal brewing device, the kit comprising:
a capsule configured for preparation of a beverage in the centrifugal brewing device by feeding liquid in the capsule and rotating the capsule along a central axis to produce a centrifugal force on the liquid traversing the capsule to force the beverage out of the capsule by the centrifugal force, and
the capsule comprises containment walls forming a main cavity of the central axis; and
the kit further comprising an insert independent from the centrifugal brewing device and which is separate from the capsule,
the insert comprises a ring-shaped portion forming a valve engaging portion configured for engagement against a valve means of the centrifugal brewing device,
the insert further comprises a transversal annular or circular portion which is inwardly and integrally connected to the ring-shaped portion,
the insert is hollow at and around the central axis, the transversal annular or circular portion has one or more through-openings for allowing liquid to flow through the insert, and the insert is configured to allow gas to flow through the insert and into the capsule prior to insertion of the kit in the centrifugal brewing device, and
the ring-shaped portion extends axially above and below the transversal annular or circular portion to form a "T" in transversal cross section, the ring-shaped portion has an outer diameter larger than the largest diameter of the capsule, and the ring-shaped portion has a structure in relief and/or recess on an upper surface thereof, the structure configured to create beverage radial flow passages during centrifugation.

2. The kit of claim 1, wherein the structure in relief and/or recess comprises a series of grooves on the upper surface of the ring-shaped portion.

3. The kit of claim 2, wherein the series of grooves are one of knurled, rectilinear, radial, or curved.

4. The kit of claim 1, wherein the structure in relief and/or recess comprises radial cuts on the upper surface of the ring-shaped portion.

5. The kit of claim 1, further comprising a set of inserts, each insert including a ring-shaped portion of a predefined height, and the ring-shaped portion of each insert of the set of inserts having a different predefined height to adjust a counter-pressure on the valve means of the centrifugal brewing device, wherein the insert of the kit is selected from the set of inserts.

6. The kit of claim 1, wherein the capsule has a flange.

7. A method for preparing a beverage in a centrifugal brewing device, the method comprising:
providing the kit according to claim 1
fitting the capsule into a capsule holder of the centrifugal brewing device, wherein the insert is combined with the capsule prior to fitting the capsule into the capsule holder;
engaging the ring-shaped portion of the insert against a valve means of the centrifugal brewing device;
feeding liquid in the capsule and rotating the capsule along the central axis to produce a centrifugal force on the liquid traversing the capsule to force the beverage out of the capsule by the centrifugal force; and
allowing the beverage to flow through the one or more through-openings of the transversal annular or circular portion of the insert.

8. The method of claim 7, wherein the structure in relief and/or recess comprises a series of grooves on the upper surface of the ring-shaped portion.

9. The method of claim 8, wherein the series of grooves are one of knurled, rectilinear, radial, or curved.

10. The method of claim 7, wherein the structure in relief and/or recess comprises radial cuts on the upper surface of the ring-shaped portion.

11. The method of claim 7, wherein the ring-shaped portion of the insert is of a predefined height and selected from a set of inserts of varying heights to adjust a counter-pressure on the valve means of the centrifugal brewing device.

12. The method of claim 7, wherein the capsule has a flange.

13. The method of claim 7 comprising filling the capsule with a beverage ingredient before fitting the capsule into the capsule holder of the centrifugal brewing device.

14. The kit of claim 1, wherein the containment walls of the capsule comprise a central aperture along the central axis.

15. The kit of claim 14, wherein the insert comprises a tubular portion configured to fit in the central aperture of the capsule.

16. The kit of claim 15, wherein the tubular portion comprises liquid distribution openings.

* * * * *